United States Patent
La Rotonda et al.

(10) Patent No.: US 7,599,935 B2
(45) Date of Patent: Oct. 6, 2009

(54) CONTROL FOR ENABLING A USER TO PREVIEW DISPLAY OF SELECTED CONTENT BASED ON ANOTHER USER'S AUTHORIZATION LEVEL

(75) Inventors: Michael La Rotonda, Oakland, CA (US); Neal Sample, Santa Cruz, CA (US); Paul Brody, Palo Alto, CA (US); Ellen Sue Perelman, San Francisco, CA (US); Ericson DeJesus, San Francisco, CA (US)

(73) Assignee: YAHOO! Inc., Sunnyvale, CA (US)

( * ) Notice: Subject to any disclaimer, the term of this patent is extended or adjusted under 35 U.S.C. 154(b) by 0 days.

(21) Appl. No.: 11/314,201

(22) Filed: Dec. 20, 2005

(65) Prior Publication Data

US 2006/0184578 A1    Aug. 17, 2006

Related U.S. Application Data

(63) Continuation-in-part of application No. 10/832,172, filed on Apr. 26, 2004, now Pat. No. 7,269,590.

(60) Provisional application No. 60/540,505, filed on Jan. 29, 2004, provisional application No. 60/544,639, filed on Feb. 13, 2004.

(51) Int. Cl.
*G06F 17/30* (2006.01)
(52) U.S. Cl. ........................................ 707/9; 707/104.1
(58) Field of Classification Search .................... 707/8, 707/9, 104.1
See application file for complete search history.

(56) References Cited

U.S. PATENT DOCUMENTS 5,835,087 A    11/1998    Herz et al.

(Continued)

FOREIGN PATENT DOCUMENTS

JP    2004-272423    * 9/2004

OTHER PUBLICATIONS

Timothy J. Mullaney, "Diller's Latest Little Bet on the Net", BusinessWeek Online, Mar. 1, 2004,<http://www.businessweek.com/print/technology/content/mar2004/tc20040031_2820_tc119.h...>.

(Continued)

*Primary Examiner*—Leslie Wong
(74) *Attorney, Agent, or Firm*—Darby & Darby PC; John W. Branch (57) ABSTRACT

Enabling a first user to preview content as it would be seen by a second user, if the second user had a selected user relationship with the first user. The selected user relationship may include a relationship degree, a relationship category, a relationship rating, and/or other form of relationship. In one embodiment, a user interface enables the first user to assign user relationships to portions of content and to other users. The first user selects a user relationship, which is used to access those portions of content that are associated with the first user and assigned the selected user relationship. The corresponding portions of content are used to generate a preview display for the first user, illustrating the portions of content that would be accessible to other users assigned the same user relationship or assigned a closer user relationship. Preview may be generated by a server or a local client.

19 Claims, 6 Drawing Sheets

U.S. PATENT DOCUMENTS

| | | | |
|---|---|---|---|
| 5,950,193 | A | 9/1999 | Kulkarni |
| 5,996,006 | A | 11/1999 | Speicher |
| 6,029,141 | A | 2/2000 | Bezos et al. |
| 6,129,141 | A | 10/2000 | Yang et al. |
| 6,175,831 | B1 | 1/2001 | Weinreich et al. |
| 6,269,369 | B1 * | 7/2001 | Robertson ................... 707/10 |
| 6,296,369 | B1 | 10/2001 | Liao |
| 6,324,541 | B1 | 11/2001 | de l'Etraz et al. |
| 6,327,573 | B1 | 12/2001 | Walker et al. |
| 6,356,879 | B2 | 3/2002 | Aggarwal et al. |
| 6,433,795 | B1 | 8/2002 | MacNaughton et al. |
| 6,449,344 | B1 | 9/2002 | Goldfinger et al. |
| 6,466,917 | B1 | 10/2002 | Goyal et al. |
| 6,606,657 | B1 | 8/2003 | Zilberstein et al. |
| 6,714,931 | B1 | 3/2004 | Papierniak et al. |
| 6,745,178 | B1 | 6/2004 | Emens et al. |
| 6,879,994 | B1 | 4/2005 | Matsliach et al. |
| 6,993,325 | B1 | 1/2006 | Waesterlid |
| 7,080,117 | B2 | 7/2006 | de Pinto et al. |
| 7,167,910 | B2 | 1/2007 | Farnham et al. |
| 2002/0023132 | A1 | 2/2002 | Tornabene et al. |
| 2002/0023230 | A1 | 2/2002 | Bolnick et al. |
| 2002/0059201 | A1 * | 5/2002 | Work ........................ 707/3 |
| 2002/0099806 | A1 | 7/2002 | Balsamo et al. |
| 2002/0103797 | A1 | 8/2002 | Goel et al. |
| 2002/0107242 | A1 | 8/2002 | Sabb et al. |
| 2002/0116466 | A1 | 8/2002 | Trevithick et al. |
| 2002/0124053 | A1 * | 9/2002 | Adams et al. .............. 709/216 |
| 2003/0050977 | A1 | 3/2003 | Puthenkulam et al. |
| 2003/0074440 | A1 * | 4/2003 | Grabarnik et al. .......... 709/224 |
| 2003/0105827 | A1 | 6/2003 | Tan et al. |
| 2003/0158855 | A1 * | 8/2003 | Farnham et al. ............ 707/102 |
| 2003/0167324 | A1 | 9/2003 | Farnham et al. |
| 2003/0231207 | A1 | 12/2003 | Huang |
| 2004/0044536 | A1 | 3/2004 | Fitzpatrick et al. |
| 2004/0088315 | A1 | 5/2004 | Elder et al. |
| 2004/0088322 | A1 | 5/2004 | Elder et al. |
| 2004/0088325 | A1 | 5/2004 | Elder et al. |
| 2004/0107242 | A1 * | 6/2004 | Vert et al. ................... 709/203 |
| 2004/0119760 | A1 * | 6/2004 | Grossman et al. .......... 345/854 |
| 2004/0122681 | A1 * | 6/2004 | Ruvolo et al. ............... 705/1 |
| 2004/0122803 | A1 | 6/2004 | Dom et al. |
| 2004/0122855 | A1 | 6/2004 | Ruvolo et al. |
| 2004/0148275 | A1 * | 7/2004 | Achlioptas .................. 707/3 |
| 2004/0177120 | A1 | 9/2004 | Kirsch |
| 2004/0199765 | A1 * | 10/2004 | Kohane et al. .............. 713/165 |
| 2004/0215648 | A1 * | 10/2004 | Marshall et al. ............ 707/102 |
| 2004/0215793 | A1 * | 10/2004 | Ryan et al. ................. 709/229 |
| 2005/0015455 | A1 | 1/2005 | Liu |
| 2005/0076021 | A1 | 4/2005 | Wu et al. |
| 2006/0242128 | A1 | 10/2006 | Goel |
| 2007/0027921 | A1 | 2/2007 | Alvarado et al. |

OTHER PUBLICATIONS

Jason Ethier, "Current Research in Social Network Theory," <http://upaya.soc.neu.edu/archive/students/Ethier-SocialNetworks.html>.

Richard V. Dragan, "Tribe.net (beta)," PC Magazine, Jan. 20, 2004, <http//:www.pcmag.com/article2/0,1759,1418688,00.asp>.

"FAQs About the ZeroDegrees Service," visited on Sep. 8, 2004, <http://www.zerodegrees.com/faq.htm>.

Matt Hines, "AOL serves up software for BREW", Dec. 9, 2003<http://news.com.com/2100-1038-5117686.html>.

Matt Hines, "America Online proposes Love.com," Dec. 10, 2003<http://news.com.com/2100-1032-5118986.html>.

Ken Jordan et al., "The Augmented Social Network: Building identity and trust into the next-generation internet," First Monday Peer-Reviewed Journal on the Internet, (Jul. 2003) <http://www.firstmonday.dk/issues/issue8_8/jordan/>.

Lorrie Faith Cranor et al., "Spam," Communications of the ACM, Aug. 1998, pp. 74-83, vol. 41, No. 8.

"Welcome to the Christian Connection Matchmaker", archive.org website of www.christian.matchmaker.com, Feb. 21, 1999.

"The Purpose Principles and Process", archive.org website of www.christian.matchmaker.com, Feb. 24, 1999.

"A Sneak Preview of the Christian Connection Matchmaker Search Page", archive.org website of www.christian.matchmaker.com, May 8, 1999.

"A Sneak Preview of the Christian Connection Matchmaker Match Page", archive.org website of www.christian.matchmaker.com, Feb. 23, 1999.

"Yahoo! Groups—What is a Group?", archive.org website of www.yahoo.com, Nov. 3, 2002.

"Yahoo! Groups—Getting Started, Groups Account, Groups Features", archive.org website of www.yahoo.com, Oct. 31, 2002.

"Yahoo! Groups—What is the spam policy of Yahoo! Groups? How do I avoid spam?", archive.org website of www.yahoo.com, Oct. 24, 2002.

Merrick, Amy; "The Best Way to . . . Find a Date—OK, so true love isn't guaranteed; But there are ways to better the odds", Wall Street Journal, New York, NY, p. R 16, ProQuest ID 64669169, Nov. 27, 2000.

Member site Selection Page for Matchmaker.com, web.archive.org webpage of Feb. 19, 1999, web.archive.org/web/19990219183131/matchmaker.com/newtry.shtml.

Welcome to the Christian Connection Matchmaker, web archive.org webpage of Feb. 22, 1999, web.archive.org/web/19990222170152/http://www.Christian.email.net/index/html.

Matchmaker.com Disclaimer, web.archive.org webpage of Apr. 20, 2000, web.archive.org/web/20000420114350/www.Christian.matchmaker.com/rules.

International Preliminary Report on Patentability dated Dec. 14, 2006 issued for corresponding International Patent Application No. PCT/US2004/038703.

International Search Report dated Oct. 3, 2006, for International Application PCT/US04/38696, filed Nov. 17, 2004.

"System Names and Numbers," archive.org website of www.christian.matchmaker.com, Apr. 24, 1999, pp. 1-3.

"Matchmaker User Tools Pages," archive.org website of www.christian.matchmaker.com, Apr. 24, 1999, pp. 1-2.

"Matchmaker Help—Block," archive.org website of www.christian.matchmaker.com, Sep. 10, 1999, p. 1.

"Matchmaker Help—Main Page," archive.org website of www.christian.matchmaker.com, Oct. 4, 1999, pp. 1-3.

International Search Report dated Jul. 7, 2005, from International Application No. PCT/US04/38704, pp. 1-16.

Non-Final Office Action for U.S. Appl. No. 10/946,636, mailed Dec. 13, 2007.

Non-Final Rejection mailed Jan. 8, 2008 for U.S. Appl. No. 10/866,954, filed Jun. 14, 2004.

Final Rejection mailed Dec. 17, 2007 for U.S. Appl. No. 10/863,926, filed Jun. 8, 2004.

Final Rejection mailed Jan. 29, 2008 for U.S. Appl. No. 10/946,630, filed Sep. 21, 2004.

Non-Final Rejection mailed Mar. 3, 2008 for U.S. Appl. No. 11/392,247, filed Mar. 29, 2006.

"Design Center Tutorial: Preview and Test Dynamic Pages on a Testing Server," Adobe.com, 6 pages, http://www.adobe.com/designcenter/dreamweaver/articles/drw8at_testserver.html (accessed Sep. 2, 2008).

The Official America Online for Windows Tour Guide, Second Edition. Copyright 1994 Tom Lichty. pp. 239-256.

U.S. Appl. No. 10/946,630, Offical Communication mailed Oct. 16, 2008.

Jordan et al., "The Augmented Social Network: Building identity and trust into the next-generation internet", first monday Peer-Reviewed Journal on the Internet, www.firstmonday.dk/issues/issue8_8/jordan/, pp. 1-62 (accessed Mar. 11, 2004).

"A Sneak Preview of the Christian Connection Matchmaker Who's On Page," Feb. 24, 1999, 3 pgs, archive.org website of www.christian.matchmaker.com, (accessed Jul. 28, 2007).

Welcome to My Yahoo!, 2 pgs., archive.org website of www.yahoo.com/r/il (accessed Feb. 15, 2007).

MatchMaker Help Pages—Frequently Asked Questions, 7 pgs., archive.org website of www.christian.matchmaker.com (accessed Feb. 15, 2007).

U.S. Appl. No. 10/832,172, Official Communication mailed May 16, 2007.

U.S. Appl. No. 10/832,172, Official Communication mailed Feb. 9, 2007.

U.S. Appl. No. 10/832,172, Official Communication mailed Aug. 23, 2006.

U.S. Appl. No. 10/946,636, Official Communication mailed Feb. 21, 2007.

U.S. Appl. No. 10/946,636, Official Communication mailed Aug. 29, 2006.

U.S. Appl. No. 10/946,630, Official Communication mailed Jul. 27, 2007.

U.S. Appl. No. 10/946,630, Official Communication mailed May 2, 2007.

U.S. Appl. No. 10/946,630, Official Communication mailed Feb. 6, 2007.

U.S. Appl. No. 10/946,630, Official Communication mailed Aug. 16, 2006.

U.S. Appl. No. 10/866,954, Official Communication mailed Aug. 8, 2007.

U.S. Appl. No. 10/866,954, Official Communication mailed Feb. 23, 2007.

U.S. Appl. No. 10/866,954, Official Communication mailed Jul. 26, 2006.

U.S. Appl. No. 10/866,954, Official Communication mailed Feb. 1, 2006.

U.S. Appl. No. 10/866,954, Official Communication mailed Mar. 16, 2005.

U.S. Appl. No. 10/863,926, Official Communication mailed Jun. 26, 2007.

U.S. Appl. No. 10/863,926, Official Communication mailed Dec. 29, 2006.

U.S. Appl. No. 10/863,926, Official Communication mailed Aug. 14, 2006.

U.S. Appl. No. 10/863,926, Official Communication mailed Feb. 28, 2006.

U.S. Appl. No. 10/863,926, Official Communication mailed Sep. 9, 2005.

U.S. Appl. No. 10/863,926, Official Communication mailed Apr. 6, 2005.

U.S. Appl. No. 10/946,636, Official Communication mailed Jul. 27, 2007.

U.S. Appl. No. 10/946,636, Official Communication mailed Jun. 20, 2008.

U.S. Appl. No. 10/946,636, Official Communication mailed Sep. 17, 2008.

U.S. Appl. No. 10/946,636, Official Communication mailed Feb. 9, 2009.

U.S. Appl. No. 10/946,630, Official Communication mailed Jan. 29, 2008.

U.S. Appl. No. 10/946,630, Official Communication mailed May 28, 2008.

U.S. Appl. No. 10/946,630, Official Communication mailed Mar. 10, 2009.

U.S. Appl. No. 10/866,954, Official Communication mailed Aug. 18, 2005.

U.S. Appl. No. 10/866,954, Official Communication mailed Jan. 8, 2008.

U.S. Appl. No. 10/866,954, Official Communication mailed Aug. 25, 2008.

U.S. Appl. No. 10/866,954, Official Communication mailed Nov. 7, 2008.

U.S. Appl. No. 10/866,954, Official Communication mailed Feb. 20, 2009.

U.S. Appl. No. 10/863,926, Official Communication mailed Dec. 17, 2007.

U.S. Appl. No. 10/863,926, Official Communication mailed Apr. 16, 2008.

U.S. Appl. No. 10/863,926, Official Communication mailed Aug. 1, 2008.

U.S. Appl. No. 10/863,926, Official Communication mailed Jan. 12, 2009.

U.S. Appl. No. 10/863,926, Official Communication mailed Apr. 1, 2009.

U.S. Appl. No. 10/392,247, Official Communication mailed Mar. 3, 2008.

U.S. Appl. No. 10/392,247, Official Communication mailed Nov. 4, 2008.

U.S. Appl. No. 10/392,247, Official Communication mailed Jan. 21, 2009.

PCT Preliminary Report on Patentability for Application No. PCT/US2004/038696 mailed Nov. 2, 2006.

PCT Preliminary Report on Patentability for Application No. PCT/US2004/038704 mailed Aug. 10, 2006.

PCT Preliminary Report on Patentability for Application No. PCT/US2004/038707 mailed Aug. 10, 2006.

PCT Preliminary Report on Patentability for Application No. PCT/US2004/038705 mailed Oct. 26, 2006.

* cited by examiner

CONTROL FOR ENABLING A USER TO PREVIEW DISPLAY OF SELECTED CONTENT BASED ON ANOTHER USER'S AUTHORIZATION LEVEL

CROSS-REFERENCE TO RELATED APPLICATIONS

This application claims the benefit of U.S. Utility application Ser. No. 10/832,172 filed on Apr. 26, 2004, the benefit of the earlier filing date of which is hereby claimed under 35 U.S.C. §120 and which is further hereby incorporated by reference.

FIELD OF ART

The present invention relates generally to managing display of content, and more particularly to a method and system for enabling a user to preview content as it would be seen by another social network user.

BACKGROUND

Many computing systems enable a user to control access to information through passwords, encryption keys, presence settings, and/or other methods. Some online systems enable a user to enter information about the user and enable the user to control whether, how, or which information is accessible to other users. For example, some online systems enable a user to enter a profile of information and establish a group of contacts. Such systems may enable only those contacts to access the profile information and/or detect whether the user is currently logged into an online service, such as a messaging service, a job placement service, or other topic-specific service. The set of contacts comprise a network of people who know a user well enough to provide their contact information. This is sometimes considered a single-level social network.

More broadly, a social network typically comprises a person's set of direct and indirect personal relationships. Direct personal relationships usually include relationships with family members, friends, colleagues, coworkers, and other people with which the person has had some form of direct contact, such as contact in person, by telephone, by email, by instant message, by letter, and the like. These direct personal relationships are sometimes referred to as first degree relationships. First degree relationships can have varying degrees of closeness, trust, and other characteristics. These relationships can also be unidirectional or bidirectional. A unidirectional relationship typically means that a first person is willing and able to interact with a second person, but the second person is not willing or able to interact with the first person. Conversely, a bidirectional relationship typically means that both people are willing and able to interact with each other.

Indirect personal relationships typically include relationships through first degree relationships to other people with whom a person has not had some form of direct contact. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as a second degree relationship.

Online social network services have developed based on specific topics, such as job placement and dating. These online social network services enable users to connect with each other if they did not previously know each other, but may share a common interest. The users share information about themselves. The precise way that the information is displayed to each other, is generally controlled by the online social network services without an ability to preview the way one's own information is displayed to another.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF EMBODIMENTS

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refer to an open-ended or inclusive transitional construct and does not exclude additional, unrecited elements, or method steps. For example, a combination that comprises A and B elements, also reads on a combination of A, B, and C elements. The meaning of "a," "an," and "the" include plural references. The meaning of "in" includes "in" and "on." Additionally, a reference to the singular includes a reference to the plural unless otherwise stated or is inconsistent with the disclosure herein. The term "or" is an inclusive "or" operator, and includes the term "and/or," unless the context clearly dictates otherwise. The phrase "in one embodiment," as used herein does not necessarily refer to the same embodiment, although it may. Similarly, the phrase "in another embodiment," as used herein does not necessarily refer to a different embodiment, although it may. The term "based on" is not exclusive and provides for being based on additional factors not described, unless the context clearly dictates otherwise. The term "user" can include a computer user, an online service subscriber, an online social network user and/or other person using an electronic device.

The term "social network" can include a group of people with which a user has direct and/or indirect relationships, as well as a service, such as an online service, for communicating information to and/or from any of the people with which a user has direct and/or indirect relationships. However, an indirect relationship can also be through a shared interest, without any degree of personal relationship between intermediate people. For example, a set of complete strangers can comprise a social network on the basis of a common interest in a topic or an activity, such as fishing. Thus, the term social network includes a group of people associated by a common interest and/or a service for communicating information to and/or from any of the people with which a user has an interest relationship.

Embodiments of the present invention provide many capabilities to utilize social networks and/or other networks. One embodiment includes an online service that enables a user to preview information as that information would be seen by another user. The preview enables a user to verify which selected content will be displayed to another user, and to see how the information will be displayed.

Illustrative Operating Environment

Figure 1:
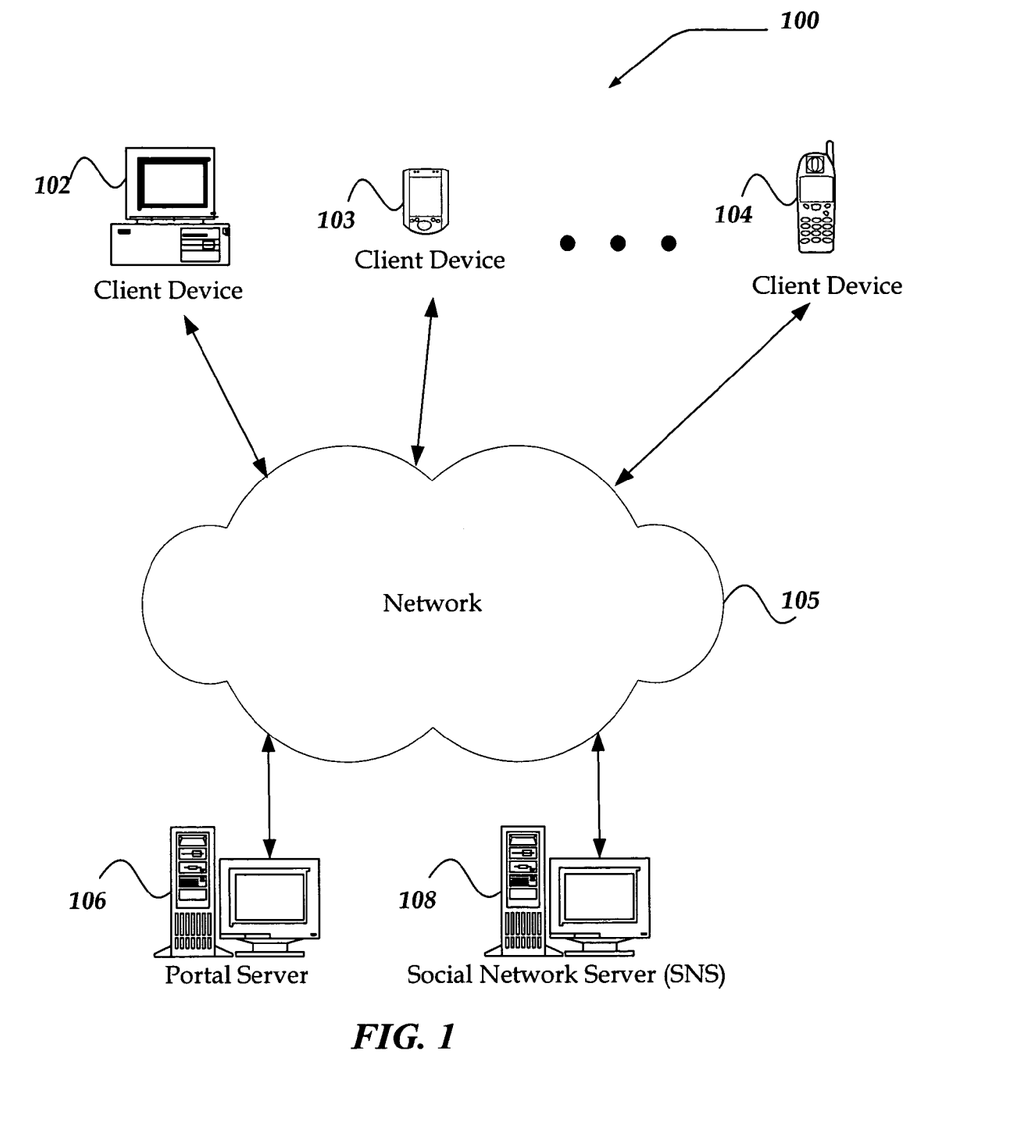
FIG. 1 shows a functional block diagram illustrating one embodiment of an environment for practicing the invention.

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-104, network 105, an optional portal server 106, and a social network server (SNS) 108. Network 105 is in communication with and enables communication between each of client devices 102-104, portal server 106, and SNS 108.

Client devices 102-104 may include virtually any computing device capable of receiving and sending a message over a network, such as network 105, to and from another computing device, such as SNS 108, each other, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 102-104 may be any device that is capable of connecting using a wired or wireless communication medium such as a PDA, POCKET PC, wearable computer, and any other device that is equipped to communicate over a wired and/or wireless communication medium.

Each client device within client devices 102-104 may include a browser application that is configured to receive and to send web pages, and the like. The browser application may be configured to receive and display graphics, text, multimedia, and the like, employing virtually any web based language, including, but not limited to Standard Generalized Markup Language (SMGL), such as HyperText Markup Language (HTML), extensible markup language (XML), a wireless application protocol (WAP), a Handheld Device Markup Language (HDML), such as Wireless Markup Language (WML), WMLScript, JavaScript, and the like.

Client devices 102-104 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

Client devices 102-104 may be further configured to enable a user to manage a user profile, degrees of relationships, categories of relationships, activity participation, and the like, which may in turn be saved at a remote location, such as SNS 108, and the like. As such, client devices 102-104 may further include a client application that is configured to manage various actions on behalf of the client device. For example, the client application may enable a user to interact with the browser application, email application, and the like, to customize how another social network user might view a persona, profile, or the like associated with the user. For example, the user may employ the client application, in part, to provide one customized view for family members, another customized view for poker members, yet another view for fishing buddies, and the like. The client application may interact with a process such as described below to customize and manage such views.

Network 105 is configured to couple one computing device to another computing device to enable them to communicate. Network 105 is enabled to employ any form of computer readable media for communicating information from one electronic device to another. Also, network 105 may include a wireless interface, and/or a wired interface, such as the Internet, in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between client devices 102-104, and SNS 108.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Portal server 106 and SNS 108 may comprise multiple computing devices or a single computing device. Portal server 106 may provide online services such as messaging, search, news, shopping, advertising, and/or the like. SNS 108 may provide similar service and/or other services that also enable users to centralize the sharing of information and viewing of information regarding other users and themselves. For example, users may have a personal web site to share and view online journals (e.g., blogs), photos, reviews, and the like. For exemplary purposes, the operations of portal server 106 and SNS 108 are described together, and generally refer to SNS 108. Briefly, SNS 108 may include any computing device capable of connecting to network 105 to manage customization of views associated with a social network user, such as a user of at least one of client devices 102-104. Devices that may operate as SNS 108 include dedicated servers, personal computers desktop computers, multiprocessor systems, microprocessor-based or programmable consumer electronics, network PCs, and the like.

SNS 108 may be configured to receive information associated with a client user and to enable the user to customize a view based in part, on the received information. The received information may include, but is not limited to, relationship degree information, relationship category information, relationship rating information, membership information associated with a category, device information, presence information, profile information, activity information, and the like.

SNS 108 may further employ the received information to enable the user to customize a view associated with a social network perspective, based in part on a degree of relationship, relationship categorization, relationship rating, and/or other criteria. By sharing varying quantities of personal information with other social network users, the user may put forth different online profiles, public personas, and the like. The user may also determine how information about the user will be displayed to other users. The received criteria employed to enable customization of the views may include, but is not limited to, degrees of separation, category of relationship (such as friend, family, colleague, and the like), as well as any assessment of closeness, trust, an offline group affiliation, an online group affiliation, and the like. SNS 108 enables the user to preview the view resulting from applying the received criteria.

SNS 108 may also enable another social network user, such as a user of one of client devices 102-104, to view the customized view based on the received criteria. SNS 108 may employ a web service, email service, and the like, to make the customized view available to the other social network user, as appropriate. SNS 108 may employ processes such as described in more detail below to manage the customized views. SNS 108 may be implemented on one or more computing devices, such as a server described with regard to FIG. 2.

Illustrative Server Environment

Figure 2:
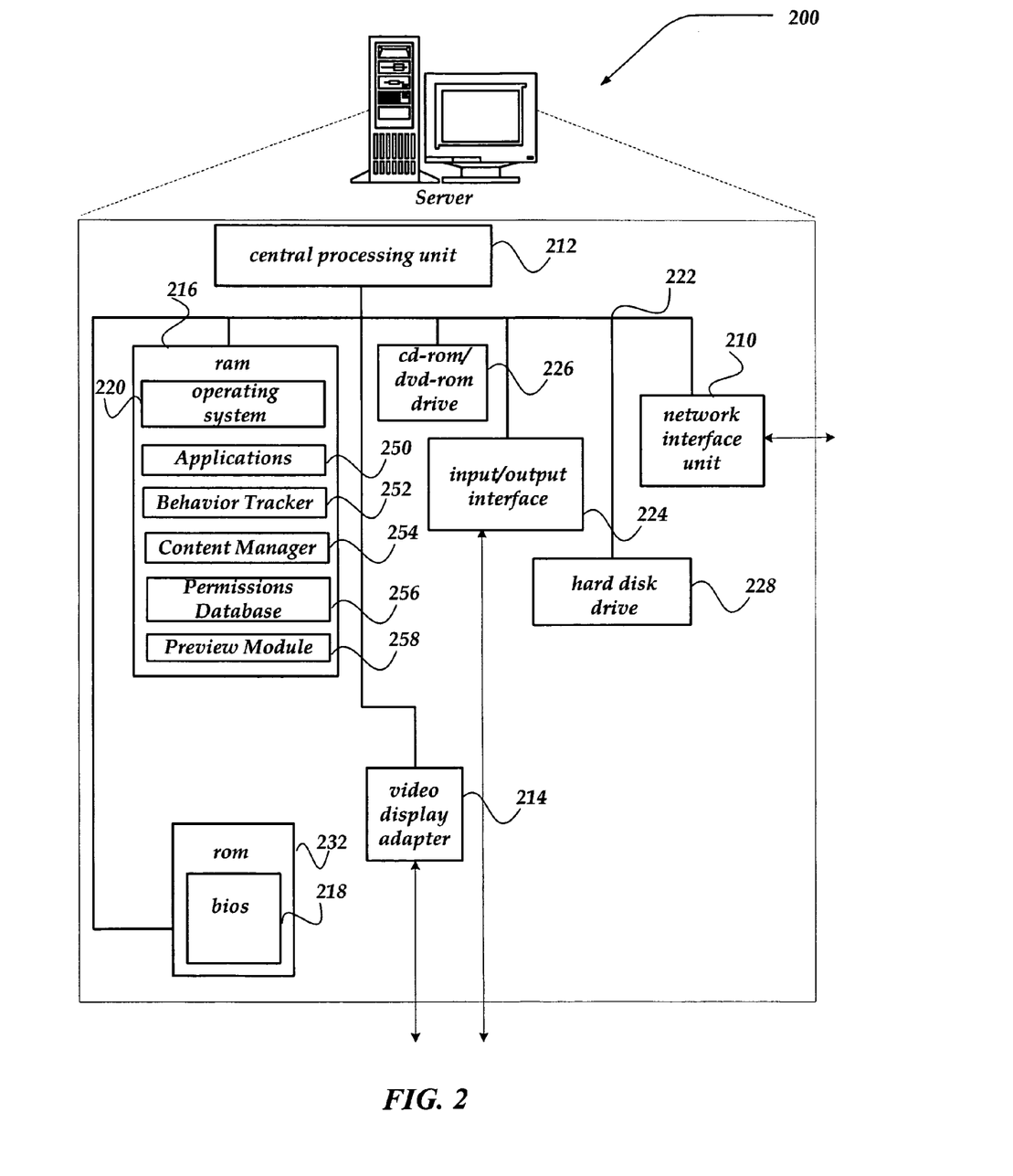
FIG. 2 shows one embodiment of a server device that may be included in a system implementing the invention.

FIG. 2 shows one embodiment of a server, according to one embodiment of the invention. Server 200 may include many more components than those shown. The components shown, however, are sufficient to disclose an illustrative embodiment for practicing the invention.

Server 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of server 102. Any general-purpose operating system may be employed. Basic input/output system ("BIOS") 218 is also provided for controlling the low-level operation of server 200. As illustrated in FIG. 2, server 200 also can communicate with the Internet, or some other communications network, such as network 105 in FIG. 1, via network interface unit 210, which is constructed for use with various communication protocols including the TCP/IP protocol. Network interface unit 210 is sometimes known as a transceiver, transceiving device, network interface card (NIC), and the like.

The mass memory as described above illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 250 are loaded into mass memory and run on operating system 220. Examples of application programs include email programs, schedulers, calendars, web services, transcoders, database programs, word processing programs, spreadsheet programs, and so forth. Mass storage may also include applications such as a behavior tracker 252, which may track a user's online activities with the user's permission. Behavior tracker 252 may track the user's portal service behaviors (e.g., web searches, online purchases, etc.), the user's social network service behaviors (e.g., frequency of inviting others to join, participation in particular social network activities, etc.), and/or other behaviors.

Mass storage may further include modules that are useful for managing a user's social network, such as a content manager 254, a permissions database 256, and a preview module 258. Content manager 254 may include a database, text, folder, file, and the like, that is configured to maintain and store information that the user's wishes to use and/or share with a social network. Content may include the user's profile information, online journals (e.g., blogs), reviews of products and/or services, photographs, and the like. The content may be entered by the user or obtained from other sources. The content may be used only with the social network or with other services, such as the portal service. The content, and modules to control the content, may be centralized or distributed over a number of resources.

Permissions database 256 may be included with content manager 254 or provided as a separate entity. Permissions database 256 may enable the user to establish and store content access permission based on user relationships, types of content, and the like. User relationships may include one or more forms of relationships, including: relationship degrees (e.g., private zeroth degree, first degree, second degree, third degree, public, etc.); user-definable relationship categories (e.g., family, co-workers, fishing buddies, etc.); relationship ratings (closest, close, connected, acquainted, haven't met, etc.); and/or other forms of relationships.

Preview module 258 may also be included with content manager 254 and/or permissions database 256. Alternatively, preview module may be provided as a separate entity. The preview module coordinates access to content and checking permissions to provide a preview of at least a portion of a user's content as would be seen by another user.

Server 200 also includes input/output interface 224 for communicating with external devices, such as a mouse, keyboard, scanner, or other input devices not shown in FIG. 2. Likewise, server 200 may further include additional mass storage facilities such as CD-ROM/DVD-ROM drive 226 and hard disk drive 228. Hard disk drive 228 is utilized by server 200 to store, among other things, application programs, databases, content manager 254, permissions database 256, preview module 258, and the like.

Illustrative Client User Interface

Figure 3:
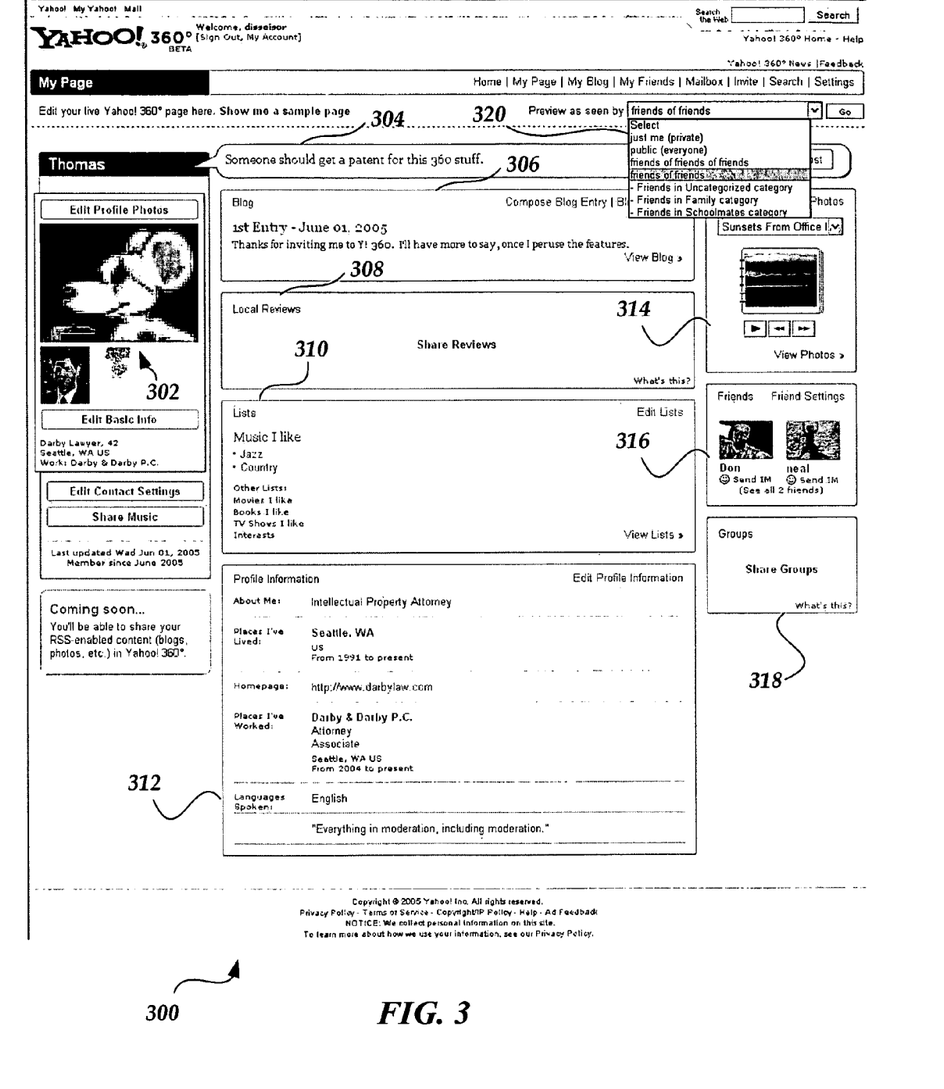
FIG. 3 shows a screen shot of a client user interface that enables a client user to edit and view content controlled by the client user.

A user interface and operation of certain aspects of an embodiment of the present invention will now be described with respect to FIGS. 3-4. FIG. 3 shows a screen shot of a client user interface 300 that enables a client user to edit and view content controlled by the client user. Client user interface 300 may be provided through a browser, a client application, or other software. This exemplary client user interface provides access to the user-controlled content through an online social network service. However, some or all of the content may be provided or accessed through a portal service, and/or other services. Some or all of the content may have been entered directly by the client user, accessed from another service through which the client user entered the content, accessed from another service that generated content, and/or provided in other ways.

Examples of content include profile images 302, a short message 304 (sometimes referred to as a "blast"), a blog 306, product or service reviews 308, lists 310 of things relevant to the client user, profile information 312 about the client user, photos 314 provided by the client user, related users 316 (such as $1^{st}$ degree related users), and groups 318 to which the client user belongs. Other content may include, but is not limited to, summary information from and/or links to personal web site(s), calendar(s), contact list(s), bulletin board(s), communication service(s), mobile service(s), entertainment service(s), shopping service(s), job services, financial service(s), dating service(s), and the like, to which the client user belongs or maintains content.

The client user can edit the content through client user interface 300 and can set parameters associated with each type of content and/or portions of content. For example, the client user can use a portion of client user interface 300 to specify that lists 310 will be viewable only to other users that the client user has assigned first degree relationships. As another example, the client user can use another portion of client user interface 300 to specify that profile information 312 will generally be viewable by other users at a third degree relationship or higher (e.g., $2^{nd}$ degree or $1^{st}$ degree). However, the client user can further specify that portions of profile information 312 (e.g., Places I've Lived) will only be viewable by one or more certain categories of first degree relationships (e.g., "Schoolmates" category). Similarly, the client user may specify that particular sets of photos are viewable only by those other users that are within a relationship rating assigned by the client user (e.g., closest, close, etc.). The relation ship is generally assigned by the client user, but may be determined based on client behavior, predefined settings, or other parameters. For instance, when enrolling in a particular group or service, the client user may agree that any corresponding content will be associated with a predetermined user relationship level.

The client user may preview the client user's content, as that content would be seen by another user with a selected relationship to the client user. Client user interface 300 may include a preview selection-drop-down box 320 that enables the client user to select a relationship. For example, the client user may wish to preview the content as it would appear to other users related at the second degree (e.g., friends of a friends).

Figure 4:
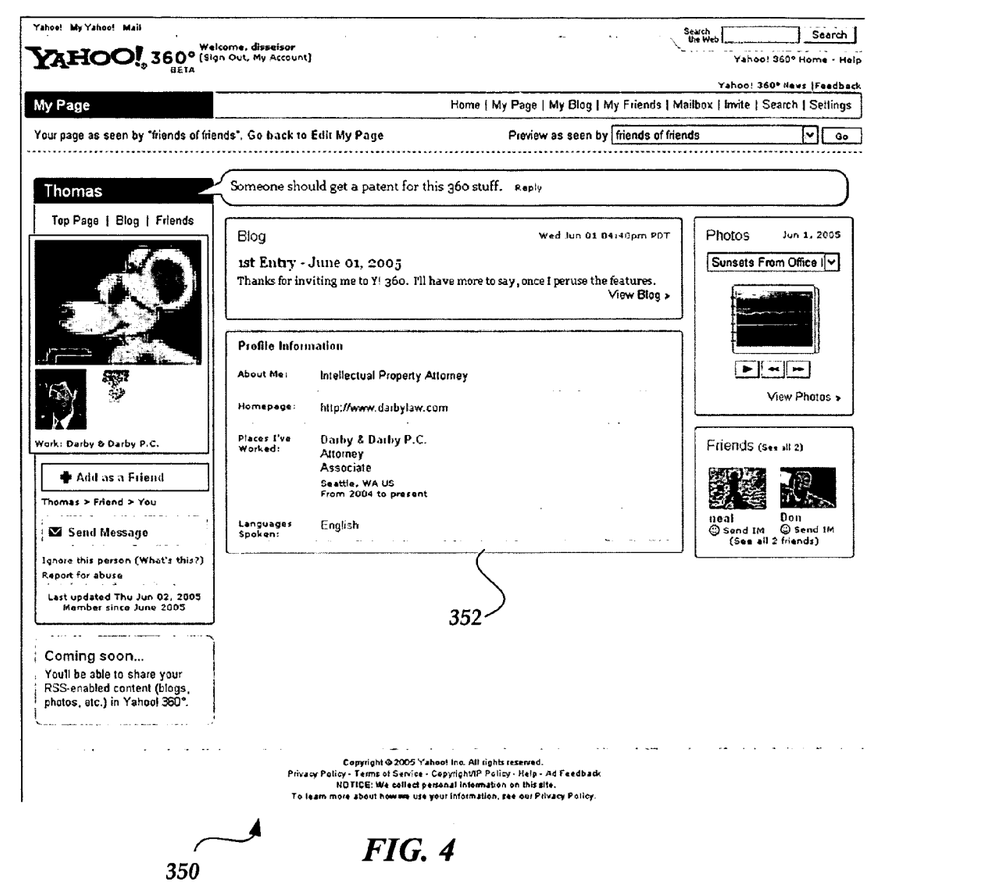
FIG. 4 shows a screen shot of a preview page illustrating a preview of the client user's content as seen by other users related in the second degree.

FIG. 4 shows a screen shot of a preview page 350 illustrating a preview of the client user's content as seen by other users related in the second degree (e.g., friends of a friends). Some of the content is not visible, because that content is only available to other users who have a closer relationship to the client user. For example, reviews 308 and lists 310 of FIG. 3 are not visible in preview page 350 of FIG. 4. The client user specified that only users with first degree relationships to the client user may view the reviews and lists. Similarly, only limited profile information 352 is visible, because other portions of the profile information are only available to other users who have a closer relationship to the client user. For example, limited profile information 352 does not show "Places I've Lived," which was shown in FIG. 3.

Illustrative Architecture and Logic

Figure 5:
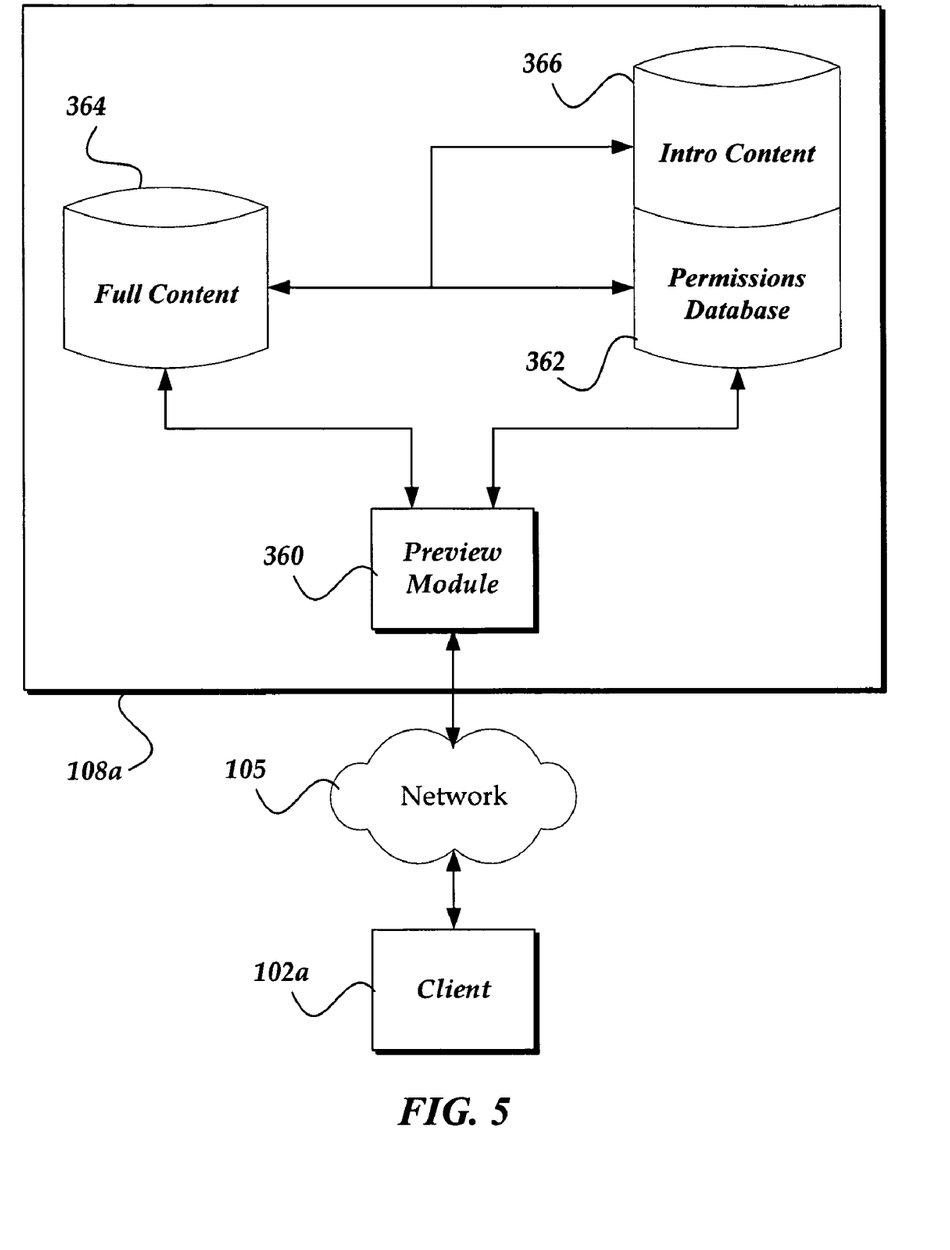
FIG. 5 illustrates an exemplary architecture that may be used to enable a client user to preview content based on another user's relationship to the client user.

FIG. 5 illustrates an exemplary architecture that may be used to enable a client 102a to preview content based on another user's relationship to the client user. Client 102a may communicate through network 105 to a server 108a. In this sample architecture, the server includes a preview module 360 that generally accesses and provides appropriate preview content to client 102a. Preview module 360 communicates with a permissions database 362 that may comprise an access control list or other data store. Permission database 362 generally maintains associations between user relationships and content. Clients generally assign one or more user relationships to content, indicate the which user relationship(s) are required to access each portion of content. These assignments may be stored in, or accessed by permissions database 362.

Permissions database 362 and preview module 360 also communicate with a full content data store 364, which maintains the blogs, profile information, lists, and/or other content provided by the client. Full content data store 364 and permissions database 362 communicate with an intro content data store 366. One or more subsets of content from full content data store 364 may be stored in intro content data store 366. The subsets of content generally have the same permissions assigned as the corresponding full content. The subsets generally comprise introductory content such as the first twenty-five words of a blog entry, the first couple of items on a list, titles of review, thumb nail photos of friends, and/or other content that provides initial information about full content. Preview module 360 determines which introductory content to accesses based on the user relationship submitted by the client. The preview module may then assemble, format, and/or otherwise prepare the introductory content and deliver it to the client for previewing. In another embodiment, substantially all of the introductory content and/or the full content may be delivered to the client, and the client may filter the content for preview based on the user relationship selected by the client user.

Figure 6:
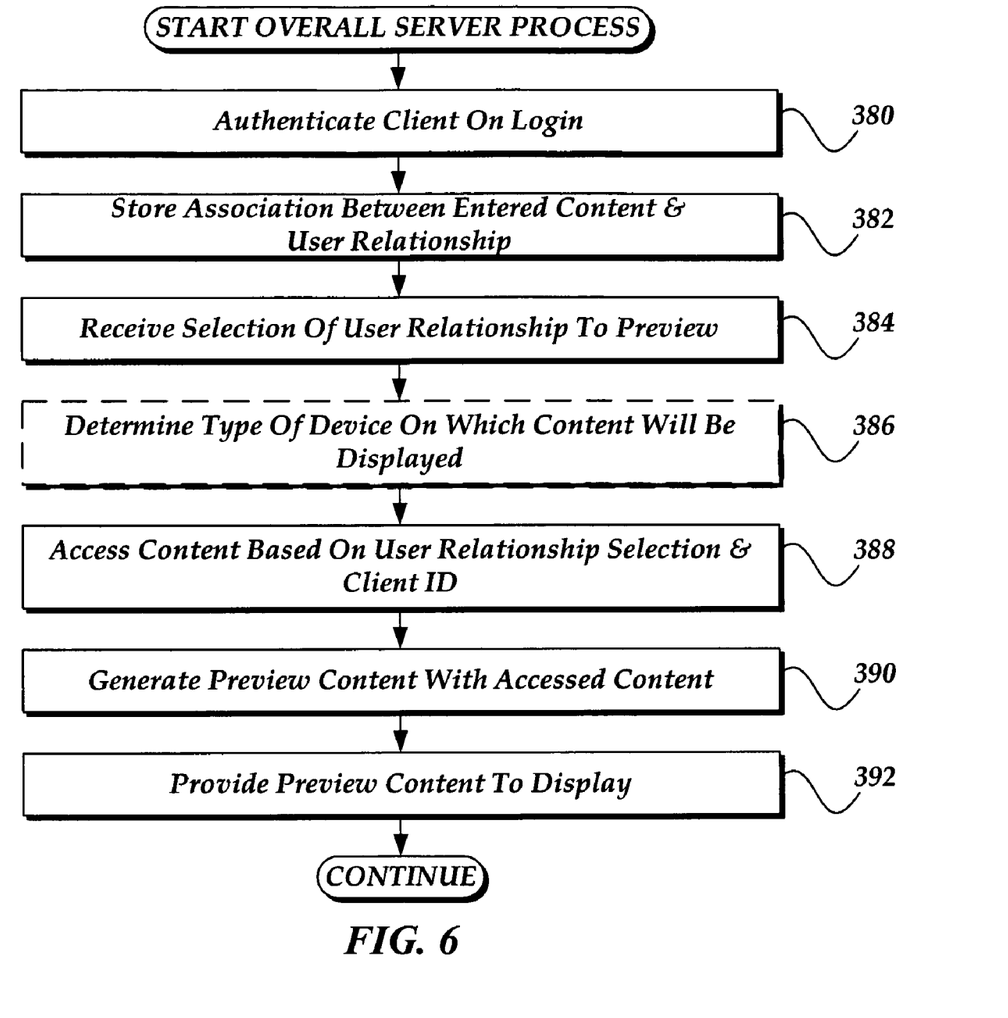
FIG. 6 is a flow diagram illustrating exemplary logic for providing a preview of content as the content would be seen by a user with a selected user relationship to the client user.

FIG. 6 is a flow diagram illustrating exemplary logic for providing a preview of content as the content would be seen by a user with a selected user relationship to a client user. This sample embodiment is discussed in terms of a server that communicates with a remote client, but the invention may be implemented in many other ways that may or may not include a server and/or a client. At an operation 380, a client user may be authenticated, such as during a login process. Upon authentication, content and other information associated with this client user may be accessed and other initialization processes may be performed. At an operation 382, client content may be stored in the full content data store and associations between the client content and user relationships are also stored. The client user may assign user relationships at the time of entering content, during a separate assignment process, and/or at other times through one or more user interfaces. Alternatively, the user relationship may be automatically assigned to the content based on information about the client user's online behavior, a predefined setting, an agreement with a content service provider, and/or other circumstances. As indicated above, a user relationship may include a degree of relationship to the client user, a category of relationship, a relationship rating, and/or other form of relationship(s). The client user also generally associates the user relationships with other users. For example, the client user may assign a "co-workers" category relationship to other users of a social network service who work together with the client user.

The client user may select and submit a user relationship to indicate which content to preview. For example, the client user may wish to preview content that would be accessible to co-workers. The selection is received at an operation 384. The selection may be received in a hypertext transfer protocol (HTTP) post message. The receiving operation may also include decrypting the message, authenticating the client sender, and/or other communication processes. At an optional operation 386, the server may also determine the capabilities of the client device, which may affect the amount, format, and/or other aspects of the content that will be returned to the client to provide the preview display. For example, the client may comprise a mobile terminal, which may have limited display space, resolution, and the like. The server may determine information about the client from a separate, or integrated, presence system, which may provide client device information and/or other information that is associated with a client user's current communication method. As a further option, the client user may submit a selection indicating that the content to be previewed should be formatted for display on a simulated device, such as a simulated mobile terminal, even though the client device may be a general purpose computing device such as a personal computer. This would allow the client user to preview content as it would appear to another user with a selected user relationship that may be using a selected client device. Those skilled in the art will recognize that other optional selections are possible to make the preview more representative of what other users would see. For example, a simulated communication speed may be selected, combinations of user relationships may be selected, and/or other options.

At an operation 388, the server accesses content based on the selected user relationship and the client user identification (ID). The content associated with the client user may generally be identified a client ID. The combination of client ID and selected user relationship enables the server to access the appropriate content for the preview. As discussed above, other client selections may further determine which content is accessed. At an operation 390, the server uses the accessed content to generate a web page, a bit map image, and/or other appropriate form of preview content that will be provided to the client. The server then provides the preview content to the client for display.

An alternative approach is to provide substantially all client user content and user relationship information to the client and have a browser and/or other client application filter the content to generate the preview. This may require additional time to transfer a large amount of content and/or user relationship information from the server to the client, but may enable the client to generate the preview faster. Changes made to the content or the user relationships stored by the server would also require updating the client to ensure an accurate preview was displayed.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for previewing content on a computer display device, comprising:
    receiving a selected user relationship indicating a relationship between a first user and a second user;
    accessing content that is limited to information associated with the first user and is associated with the selected user relationship between the first user and the second user, wherein the selected user relationship controls which portions of the content are accessible to the second user if the second user were to request access to the content associated with the first user; and
    providing a preview portion of the accessed content for display to the first user on the computer display device, enabling the first user to preview the preview portion of the accessed content as it would be displayed to the second user on another computer display device.

2. The method of claim 1, further comprising, prior to accessing the content, associating the content with a user relationship by at least one of the following:
    receiving an assignment of the user relationship to the content from the first user; and
    automatically associating the content with the user relationship based on one of the following; a behavior, a predefined setting, and an agreement.

3. The method of claim 1, wherein the selected user relationship is received from a client user interface operated by the first user.

4. The method of claim 1, wherein the selected user relationship comprises at least one of the following:
    a degree of relationship between the first user and the second user;
    a category of relationship between the first user and the second user; and
    a rating of the relationship between the first user and the second user.

5. The method of claim 1, wherein accessed content includes at least one of the following; profile information, a blog entry, a review, a list, a set of images, information about a related user; information about a group to which the first user belongs, and a message.

6. The method of claim 1, wherein the preview portion is provided as a markup document for display by a browser.

7. The method of claim 1, further comprising providing the content to a client that locally accesses the content and provides the preview portion by filtering the content to enable the first user to preview the preview portion of the accessed content as it would be seen by the second user.

8. The method of claim 1, further comprising preparing the preview portion based on a capability of a device through which the preview portion will displayed to the first user.

9. A computer readable storage medium, comprising executable instructions for performing actions of claim 1.

10. A server for previewing content, comprising:
a communication interface in communication with a client;
a memory for storing instructions; and
a processor in communication with the communication interface and with the memory, wherein the processor performs actions based at least in part on the stored instructions, including:
receiving from the client a preview selection indicating a user relationship;
accessing content that is limited to information associated with the client and the user relationship, wherein the user relationship controls which portions of the content are accessible to a user associated with the user relationship; and
providing to the client a preview of the content as the content would be displayed to the user associated with the user relationship.

11. The server of claim 10, wherein the processor actions further include, prior to accessing the content, associating the content with a user relationship by at least one of the following:
receiving an assignment of the user relationship to the content from the client; and
automatically associating the content with the user relationship based on one of the following; a behavior, a predefined setting, and an agreement.

12. The server of claim 10, wherein the preview selection indicates at least one of the following:
a degree of relationship between the client and another user;
a category of relationship between the client and the other user; and
a rating of the relationship between the client and the other user.

13. The server of claim 10, wherein accessed content includes at least one of the following; profile information, a blog entry, a review, a list, a set of images, information about a related user; information about a group to which the client belongs, and a message.

14. The server of claim 10, wherein the processor actions further include preparing the preview based on a capability of a device through which the preview will displayed through the client.

15. A processor readable storage medium that includes instructions and data, wherein the execution of the instructions provides for previewing content at a computer display device by enabling actions, the actions comprising:
providing a user interface that enables a first user to select a user relationship that is associated with a set of content accessible to a second user, wherein the selected user relationship identifies a form of association, of a plurality of possible associations, between the first user and the second user;
enabling the first user to submit the selected user relationship and an identifier of the first user in a request for the set of content, which comprises information about the first user that the first user has specified as accessible to any user that is related to the first user with the form of association identified by the selected relationship; and
displaying the set of content for viewing by the first user at the computer display device.

16. The method of claim 15, further comprising, prior to enabling the first user to request the set of content, enabling the first user to associate a portion of the content with a user relationship.

17. The method of claim 15, further comprising using the user relationship to filter content stored by a local client device to obtain the set of content.

18. A client device for previewing content, comprising:
a communication interface in communication with a server;
a memory for storing instructions; and
a processor in communication with the communication interface and with the memory, wherein the processor performs actions based at least in part on the stored instructions, including:
providing a user interface that enables a first user to select a user relationship that is associated with a set of content accessible to a second user, wherein the content is limited to information associated with both the first user and the selected user relationship, and wherein the selected user relationship controls which portions of the content are accessible to the second user if the second user were to request access to the content associated with the first user;
enabling the first user to submit the selected user relationship and an identifier of the first user in a request the set of content; and
displaying the set of content for viewing by the first user.

19. The client device of claim 18, wherein the client device comprises a mobile terminal.

* * * * *